United States Patent
Korten et al.

(10) Patent No.: US 12,233,599 B2
(45) Date of Patent: Feb. 25, 2025

(54) BUILD PLATFORM FOR USE IN AN ADDITIVE MANUFACTURING DEVICE

(71) Applicant: SOLVENTUM INTELLECTUAL PROPERTIES COMPANY, Maplewood, MN (US)

(72) Inventors: Malte Korten, Moorenweis (DE); Gioacchino Raia, Türkenfeld (DE); Bastian P. Kirchner, Fürstenfeldbruck (DE); Daniel D. Oberpertinger, Herrsching (DE); Anja Friedrich, Unterschleißheim (DE); Andreas G. Herrmann, Munich (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 509 days.

(21) Appl. No.: 17/593,288

(22) PCT Filed: Mar. 26, 2020

(86) PCT No.: PCT/IB2020/052881
§ 371 (c)(1),
(2) Date: Sep. 15, 2021

(87) PCT Pub. No.: WO2020/201943
PCT Pub. Date: Oct. 8, 2020

(65) Prior Publication Data
US 2022/0203616 A1    Jun. 30, 2022

Related U.S. Application Data

(60) Provisional application No. 62/825,934, filed on Mar. 29, 2019.

(51) Int. Cl.
*B29C 64/245* (2017.01)
*B29C 64/124* (2017.01)
(Continued)

(52) U.S. Cl.
CPC .......... *B29C 64/245* (2017.08); *B29C 64/124* (2017.08); *B33Y 10/00* (2014.12); *B33Y 30/00* (2014.12); *B29K 2909/02* (2013.01)

(58) Field of Classification Search
CPC ..... B29C 64/245; B29C 64/124; B33Y 30/00; B29K 2909/02
See application file for complete search history.

(56) References Cited

U.S. PATENT DOCUMENTS

| | | |
|---|---|---|
| 6,730,156 B1 | 5/2004 | Windisch |
| 9,434,107 B2 | 9/2016 | Zenere |

(Continued)

FOREIGN PATENT DOCUMENTS

| | | |
|---|---|---|
| CN | 106142552 A | 11/2016 |
| JP | 2010100883 | 5/2010 |

(Continued)

OTHER PUBLICATIONS

Ghomi, "New Precipitation Method for Synthesis of Nano-Fluorapatite," Material Research Innovations, 2013, vol. 17, No. 4, pp. 257-262.

(Continued)

*Primary Examiner* — Jeffrey M Wollschlager
*Assistant Examiner* — Xue H Liu

(57) ABSTRACT

The present disclosure provides a build platform for use in an additive manufacturing device that is builds up an object from layers of a light-hardenable resin, wherein the build platform comprises a build surface for building up the object thereon, and wherein the build surface comprises a ceramic material. The disclosure also provides a method of making a build surface comprises a ceramic surface. Further, the disclosure provides additive manufacturing devices that (Continued)

include build platforms comprising ceramic material. The disclosure also describes articles made using the methods and devices described.

10 Claims, 4 Drawing Sheets

(51) Int. Cl.
 *B33Y 10/00* (2015.01)
 *B33Y 30/00* (2015.01)

(56) References Cited

U.S. PATENT DOCUMENTS

| | | |
|---|---|---|
| 11,192,277 B2 | 12/2021 | Yun |
| 2016/0017611 A1 | 6/2016 | Reese et al. |
| 2016/0176118 A1 | 6/2016 | Reese |
| 2017/0317259 A1 | 11/2017 | Hatch et al. |
| 2018/0029124 A1 | 2/2018 | Okamoto |
| 2018/0029125 A1 | 2/2018 | Okamoto et al. |
| 2018/0133955 A1 | 5/2018 | Gibson |
| 2020/0238615 A1 | 7/2020 | Staal et al. |

FOREIGN PATENT DOCUMENTS

| | | |
|---|---|---|
| WO | WO 2013-055432 | 4/2013 |
| WO | 2017051029 | 3/2017 |
| WO | 2017051029 A1 | 3/2017 |
| WO | WO 2018-143917 | 8/2018 |
| WO | WO 2021-024162 | 2/2021 |

OTHER PUBLICATIONS

Kannan, "Synthesis and Mechanical Behaviour of Chlorapatite and Chlorapatite/ß-TCP Composites," Journal of the European Ceramic Society, 2007, vol. 27, No. 5, pp. 2287-2294.

Montazeri, "Synthesis of Fluorapatite-Hydroxyapatite Nanoparticles and Toxicity Investigations," International Journal of Nanomedicine, 2011, vol. 6, pp. 197-201.

International Search Report for PCT International Application No. PCT/IB2020/052881, mailed on Jul. 17, 2020, 5 pages.

BUILD PLATFORM FOR USE IN AN ADDITIVE MANUFACTURING DEVICE

CROSS REFERENCE TO RELATED APPLICATIONS

This application is a national stage filing under 35 U.S.C. 371 of PCT/IB2020/052881, filed Mar. 26, 2020, which claims the benefit of U.S. Provisional Application No. 62/825,934, filed Mar. 29, 2019, the disclosure of which is incorporated by reference in its/their entirety herein.

TECHNICAL FIELD

The present disclosure broadly relates to a build platform for use in an additive manufacturing device, wherein the build platform comprises a ceramic surface. The invention also relates to methods of using such a device. The invention also relates to articles prepared by the use of such an additive manufacturing device that includes a build platform comprising a ceramic surface.

BACKGROUND

"Additive manufacturing" processes typically allow for building up an object in its desired individual shape by successively adding material, for example in successive layers, to create that shape. In contrast, "subtractive manufacturing processes" include where an object is machined from an oversized blank by removal of material. In some technical fields, physical objects or mechanical workpieces are becoming more commonly manufactured by additive manufacturing processes as technology advances.

Some additive manufacturing processes are based on stereolithography. Stereolithography generally uses light for hardening a light-hardenable or photopolymerizable resins. Data based on computer aided design and/or computer aided manufacturing (CAD/CAM) is used to project a light pattern on a layer of light-hardenable resin. The photosensitive resin typically solidifies because of exposure to light, so that a layer of solidified resin according to the desired pattern is formed. For example, selectively applying energy to the photopolymerizable (light-hardenable) composition in a container (vat) can comprise applying actinic radiation, such as UV radiation, visible radiation, e-beam radiation, or any combination thereof, having a sufficient energy to cure the photopolymerizable composition. The skilled practitioner can select a suitable radiation source and range of wavelengths for a particular application without undue experimentation.

A desired three-dimensional object is created by consecutively adding layers. Thereby, the pattern is controlled according to the desired shape of the three-dimensional object.

While additive manufacturing processes are widely used in the industry for rapid prototyping, the manufacturing of finished products in many areas is still challenging. Some materials used in rapid prototyping are not intended to be compatible for contact with the human body. However, when making dental articles by an additive manufacturing process, it must be ensured that the materials used do not contain any substances that are potentially harmful for patients. Additionally, the environment in which the dental articles are manufactured must fulfill certain hygiene requirements to prevent the dental articles from being contaminated with undesired substances.

Although there are approaches for making dental articles by additive manufacturing, there is still a need for a device that assists in minimizing any cross-contamination with undesired substances during additive manufacturing of dental articles.

SUMMARY

This disclosure relates to an additive manufacturing device for building up an object from layers of a light-hardenable resin, a build platform and methods of using the same. In one example, the disclosure is directed to a build platform for use in an additive manufacturing device that builds up an object from layers of a light-hardenable resin. The build platform comprises a build surface for building up the object thereon, wherein the build surface comprises a ceramic material. In another example, the disclosure relates to an additive manufacturing device for building up an object from layers of a light-hardenable resin. The additive manufacturing device comprises: a build carrier; a light source for emitting light toward the modeling plate, wherein build carrier and the light source are movable relative to each other; a build platform comprising a build surface for building up the object thereon, wherein the build surface is formed from a plurality of blocks comprising the ceramic build surface, and wherein each block has a planar surface section that extends in a common plane, wherein the plurality of spaced planar surface sections form the build surface. The disclosure relates to a method of making a build platform for use in an additive manufacturing device for building up an object from layers of a light-hardenable resin on a build surface formed by the build platform. The method comprises: providing a plurality of precursors of ceramic-surfaced blocks; and sandblasting a surface of each block precursor, wherein the sandblasted surface forms a surface section of a build surface. The disclosure relates to the build up of an object from layers of a light-hardenable resin. In some embodiments the object may be a dental article. Examples of dental articles include crowns (including monolithic crowns), bridges, inlays, onlays, veneers, facings, copings, crown and bridged framework, implants, abutments, orthodontic appliances (e.g. brackets, buccal tubes, cleats, attachments, and buttons) and parts thereof. The surface of a tooth is considered not to be a dental article.

DETAILED DESCRIPTION

Figure 1:
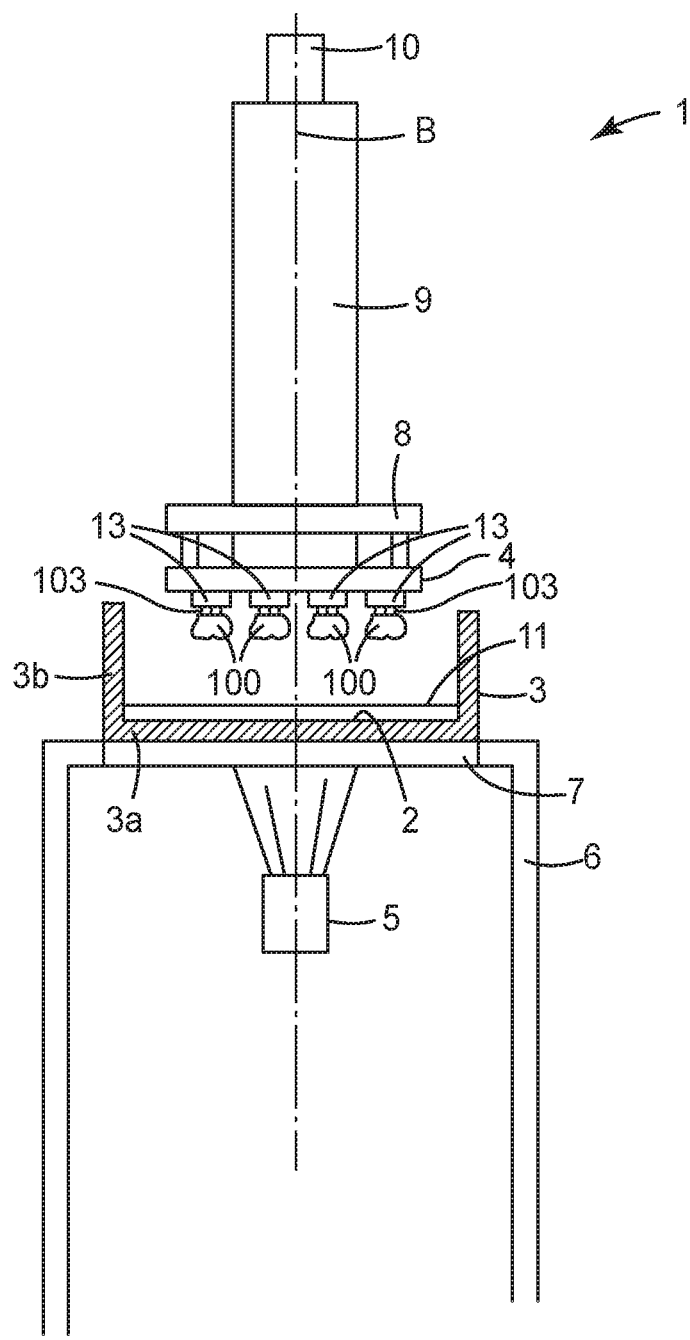
FIG. 1 is a cross-sectional schematic view of an additive manufacturing device according to one embodiment of the invention.

The invention relates to a build platform for use in an additive manufacturing device. In some embodiments the build platform for use in an additive manufacturing device may be especially useful for manufacturing a dental article. Examples of dental articles include crowns (including monolithic crowns), bridges, inlays, onlays, veneers, facings, copings, crown and bridged framework, implants, abutments, orthodontic appliances (e.g. brackets, buccal tubes, cleats, attachments, and buttons) and parts thereof.

The surface of a tooth is considered not to be a dental article. Such an additive manufacturing device is based on layerwise building up an object with layers from a light-hardenable resin. Further, the invention relates to the additive manufacturing device that comprises the build platform. The build platform comprises a build surface for building up the article thereon. In one embodiment, the build surface is preferably formed of a ceramic material. In one embodiment, the build surface comprises zirconia ($ZrO_2$).

The invention has certain advantages in that it provides for an additive manufacturing device and an additive manufacturing method in which residual light-hardenable or hardened resin can be removed from the build surface with minimized efforts. This further allows minimizing any residual light-hardenable or hardened resin present on a used build surface used for building up any further objects. Thus, cross-contamination between residual light-hardenable or hardened resin and fresh light-hardenable resin can be minimized. The invention is further advantageous in that it provides a build surface that is more durable than a build surface formed of metal.

Glossary

As used herein, "ceramic" or "ceramic article" includes amorphous material, glass, crystalline ceramic, glass-ceramic, and combinations thereof, and refers to non-metallic materials produced by application of heat. Ceramics are usually classified as inorganic materials. The term "amorphous material" refers to material that lacks long range crystal structure as determined by X-ray diffraction and/or has an exothermic peak corresponding to the crystallization of the amorphous material as determined by DTA (differential thermal analysis). The term "glass" refers to amorphous material exhibiting a glass transition temperature. The term "glass-ceramic" refers to ceramics comprising crystals formed by heat-treating amorphous material. The term "crystalline ceramic" refers to a ceramic material exhibiting a discernible X-ray powder diffraction pattern. "Crystalline" means a solid composed of atoms arranged in a pattern periodic in three dimensions (i.e., has long-range crystal structure, which may be determined by techniques such as X-ray diffraction). A "crystallite" means a crystalline domain of a solid having a defined crystal structure. A crystallite can only have one crystal phase.

As used herein, "ceramic particle" includes particles of amorphous material, glass, crystalline ceramic, glass-ceramic, and combinations thereof, and refers to non-metallic materials produced by application of heat or made by a chemical synthesis process. Ceramic particles are usually classified as inorganic materials. The term "amorphous material" with respect to ceramic particles refers to a material derived from a melt and/or a vapor phase as well as a material made from chemical synthesis, wherein the material lacks long range crystal structure as determined by X-ray diffraction and/or has an exothermic peak corresponding to the crystallization of the amorphous material as determined by DTA (differential thermal analysis). For instance, amorphous silica nanoparticles may be generated by condensation of silanes to form the nanoparticles.

As used herein, "additive manufacturing" means processes used to make 3-dimensional articles. An example of an additive manufacturing technique is stereolithography (SLA), in which successive layers of material are laid down under computer control. The articles can be of almost any shape or geometry and are produced from a 3-dimensional model or other electronic data source.

As used herein, "sol" refers to a continuous liquid phase containing discrete particles having sizes in a range from 1 nanometer (nm) to 100 nm.

As used herein, "slurry" refers to a continuous liquid phase containing discrete particles having sizes in a range from greater than 100 nm to 50 micrometers or from greater than 100 nm to 10 micrometers. A slurry may optionally further contain discrete particles having sizes in a range from 1 nanometer (nm) to 100 nm.

As used herein, a "powder" refers to a dry, bulk material composed of a large number of fine particles that may flow freely when shaken or tilted.

As used herein, a "particle" refers to a substance being a solid having a shape which can be geometrically determined. The shape can be regular or irregular. Particles can typically be analyzed with respect to e.g., particle size and particle size distribution. A particle can comprise one or more crystallites. Thus, a particle can comprise one or more crystal phases.

As used herein, "associated" refers to a grouping of two or more primary particles that are aggregated and/or agglomerated. Similarly, the term "non-associated" refers to two or more primary particles that are free or substantially free from aggregation and/or agglomeration.

As used herein, "aggregation" refers to a strong association of two or more primary particles. For example, the primary particles may be chemically bound to one another. The breakdown of aggregates into smaller particles (e.g., primary particles) is generally difficult to achieve.

As used herein, "agglomeration" refers to a weak association of two or more primary particles. For example, particles may be held together by charge or polarity. The breakdown of agglomerates into smaller particles (e.g., primary particles) is less difficult than the breakdown of aggregates into smaller particles.

As used herein, "primary particle size" refers to the size of a non-associated single crystalline or single amorphous ceramic particle, which is considered to be a primary particle. X-ray diffraction (XRD) for crystalline particles and transmission electron microscopy (TEM) for amorphous particles are typically used to measure the primary particle size.

As used herein, "essentially spherical" means that the shape of the particles is close to a sphere. It does not contain sharp edges, which may result from a milling process.

As used herein, "soluble" means that a component (e.g., a solid) can be completely dissolved within a solvent. That is, the substance is able to form individual molecules (like glucose) or ions (like sodium chloride) when dispersed in water at 23° C. The solubilization process, however, might take some time, e.g. stirring the component over a couple of hours (e.g., 10 to 20 hours) might be required.

As used herein, "density" means the ratio of mass to volume of an object. The unit of density is typically grams per cubic centimeter ($g/cm^3$). The density of an object can be calculated e.g., by determining its volume (e.g., by calculation or applying the Archimedes principle or method) and measuring its mass. The volume of a sample can be determined based on the overall outer dimensions of the sample. The density of the sample can be calculated from the measured sample volume and the sample mass. The total volume of a material sample can be calculated from the mass of the sample and the density of the used material. The total volume of cells in the sample is assumed to be the remainder of the sample volume (100% minus the total volume of material).

As used herein, "theoretical density" refers to the maximum possible density that would be obtained in a sintered article if all pores were removed. The percent of the theoretical density for a sintered article can be determined, for example, from electron micrographs of a cross-section of the sintered article. The percent of the area of the sintered article in the electron micrograph that is attributable to pores can be calculated. Stated differently, the percent of the theoretical density can be calculated by subtracting the percent voids from 100 percent. That is, if 1 percent of the area of the electron micrograph of the sintered article is attributable to pores, the sintered article is considered to have a density equal to 99 percent of the theoretical density. The density can also be determined by the Archimedes method.

As used herein, "porous material" refers to a material comprising a partial volume that is formed by voids, pores, or cells in the technical field of ceramics. Accordingly, an "open-celled" structure of a material sometimes is referred to as "open-porous" structure, and a "closed-celled" material structure sometimes is referred to as a "closed-porous" or "non-porous" structure. It may also be found that instead of the term "cell" sometimes "pore" is used in this technical field. The material structure categories "open-celled" and "closed-celled," or "porous" and "non-porous" can be determined for different porosities measured on different material samples (e.g., using a mercury "Poremaster 60-GT" from Quantachrome Inc., USA) according to DIN 66133. A material having an open-celled or open-porous structure can be passed through by e.g., gases.

As used herein, "heat treating", "calcining", "binder burn out", or "debindering" refers to a process of heating solid material to drive off at least 90 percent by weight of volatile chemically bound components (e.g., organic components) (versus, for example, drying, in which physically bonded water is driven off by heating). Heat treating is done at a temperature below a temperature needed to conduct a sintering step.

As used herein, "sintering" and "firing" are used interchangeably. A porous (e.g., pre-sintered) ceramic article shrinks during a sintering step, that is, if an adequate temperature is applied. The sintering temperature to be applied depends on the ceramic material chosen. Sintering typically includes the densification of a porous material to a less porous material (a material having less cells), or essentially a "non-porous" material having a higher density. In some cases sintering may also include changes of the material phase composition (for example, a partial conversion of an amorphous phase toward a crystalline phase).

As used herein, "gel", "gelled article", and "gelled body" are used interchangeably and mean a three-dimensional gel resulting from the curing reaction of polymerizable components contained in a slurry or sol, including organic binder and solvent.

As used herein, "green body" means an un-sintered ceramic item, typically having an organic binder present.

As used herein, a "pre-sintered" ceramic item is an item that has had solvent and binder removed and exhibits a density of lower than 93% of its theoretical density.

As used herein, "geometrically defined article" means an article the shape of which can be described with geometrical terms including 2-dimensional terms like circle, square, rectangle, and 3-dimensional terms like layer, cube, cuboid, sphere.

As used herein, a "dental article" means any article which can or is to be used in the dental or orthodontic field, especially for producing of or as dental restoration, a tooth model and parts thereof. Examples of dental articles include crowns (including monolithic crowns), bridges, inlays, onlays, veneers, facings, copings, crown and bridged framework, implants, abutments, orthodontic appliances (e.g. brackets, buccal tubes, cleats and buttons) and parts thereof. The surface of a tooth is considered not to be a dental article.

A material or composition is "essentially free" or "substantially free" of a certain component within the meaning of the invention, if the material or composition does not contain said component as an essential feature. Thus, said component is not willfully added to the composition or material either as such or in combination with other components or ingredient of other components. A composition or material being essentially free of a certain component usually contains the component in an amount of less than about 1 wt. %, or less than about 0.1 wt. %, or less than about 0.01 wt. % (or less than about 0.05 mol/l solvent, or less than about 0.005 mol/l solvent, or less than about 0.0005 mol/l solvent) with respect to the whole composition or material. Ideally the composition or material does not contain the said component at all. However, sometimes the presence of a small amount of the said component is not avoidable e.g., due to impurities.

As used herein, "hardenable" refers to a material or composition that can be cured or solidified, e.g., by heating to remove solvent, heating to cause polymerization, chemical crosslinking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "integral" refers to being made at the same time or being incapable of being separated without damaging one or more of the (integral) parts, e.g., "unitary".

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

As used herein, "non-crosslinkable" refers to a polymer that does not undergo crosslinking when exposed to actinic radiation or elevated heat. Typically, non-crosslinkable polymers are non-functionalized polymers such that they lack functional groups that would participate in crosslinking.

As used herein, the terms "polymerizable slurry or sol" and "polymerizable composition" and "light-hardenable resin" are used interchangeably and mean a hardenable composition that can undergo polymerization upon initiation (e.g., free-radical polymerization initiation). Typically, prior to polymerization (e.g., hardening), the polymerizable slurry/sol or composition has a viscosity profile consistent with the requirements and parameters of one or more additive manufacturing (e.g., 3D printing) systems. In some embodiments, for instance, hardening comprises irradiating with actinic radiation having sufficient energy to initiate a polymerization or cross-linking reaction, for a "photopolymerizable slurry or sol". For instance, in some embodiments, ultraviolet (UV) radiation, visible radiation, e-beam radiation, or a combination, can be used.

As used herein, a "resin" contains all polymerizable components (monomers, oligomers and/or polymers) being present in a hardenable slurry/sol or composition. The resin may contain only one polymerizable component compound or a mixture of different polymerizable compounds.

As used herein, "sintered article" refers to a gelled article that has been dried, heated to remove the organic matrix, and then further heated to reduce porosity and to densify. The density after sintering is at least 40 percent of the theoretical density. Articles having a density in a range of 40 to 93 percent of the theoretical density typically have open porosity (pores open to surface, "porous"). Above 93 percent or 95 percent of the theoretical density, there are typically closed pores, "non-porous," (no pores open to the surface).

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically cross-linked polymers.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In one embodiment, the build surface comprising a ceramic material has a non-porous material structure. This means that preferably the build surface comprises a sintered ceramic, obtained or obtainable from sintering a ceramic green body to its full density. In some embodiments the sintered ceramic material comprises sintered zirconia ($ZrO_2$).

In another embodiment, the build surface is provided by a plurality of spaced planar surface sections. Accordingly, the build platform may comprise the plurality of spaced planar surface sections which combine to form the build surface. The plurality of surface sections, and thus the build surface, preferably extend in a common plane.

In yet another embodiment, a gap is formed between adjacent surface sections. The gap preferably has a width in a dimension of the common plane and a depth in a dimension perpendicular to the common plane. For example, the width may be defined by the shortest distance between two adjacent surface sections.

In another embodiment, the surface sections have a rectangular shape or are square shaped. In this embodiment, the surface sections may be spaced at a uniform distance. Thus, the gap or gaps of a uniform width are formed. Each surface section may be generally polyangular, for example square-shaped or rectangular. However, each surface section could be hexagonal, triangular or of any other appropriate shape, with gaps having a uniform width arranged between.

In yet another embodiment, the depth of the gap between adjacent surface sections is greater than 1 mm. Further, the width of the gap may be greater than 8 mm. Even further, the width of the gap may be 20 mm. The amount of any light-hardenable resin receivable in the gap can be determined by determining the depth and width of the gap.

In other embodiments, each surface section has a surface roughness of Ra between 0.5 and 1.25 µm or Rz between 10 and 20 µm. It has been found that such a surface roughness provides for a sufficient retention between the article built up of the build surface and still enables the build surface to be cleaned to a maximized extent.

In one embodiment, the surface sections are provided by a plurality of ceramic blocks. In particular, each of the plurality of ceramic blocks may have a surface that corresponds to one of the surface sections. The ceramic blocks are preferably made of ceramic only. In some embodiments the ceramic blocks comprise zirconia ($ZrO_2$).

In yet another embodiment, each ceramic block has one or more recesses extending into the ceramic block from a side opposite of the surface section. At least one or some of the recesses may be V-shaped or T-shaped. Thus, the ceramic blocks may be fixed in the additive manufacturing device by use of threaded slot nuts engaging the recess(es). One or some of the recesses may be cylindrical for receiving a threaded insert. This enables fixing the ceramic blocks in the additive manufacturing device by use of screws.

In another embodiment, the ceramic blocks are spaced from each other to provide the desired gap between. The ceramic blocks are preferably individually removable from the additive manufacturing device. This allows for the ceramic blocks to be individually cleaned. For example, the ceramic blocks may be cleaned by heating or burning at temperatures at certain temperatures. The temperature selected depends on the ceramic block composition and the resin composition. For example, the temperature could be above 1000° C. degrees. The temperatures should be selected so that the residual light-hardenable or hardened resin typically burns residue-free or essentially residue-free.

In one aspect, the invention also relates to an additive manufacturing device for layerwise building up an article from layers of a light-hardenable resin. The additive manufacturing device comprises a build carrier; a vat or container, wherein the vat container is appropriately sized, and is comprised of one or more materials selected to contain the liquid light-hardenable resin; and a light source for emitting light toward the build carrier. The build carrier and the light source are movable relative to each other. Further the additive manufacturing device comprises a build platform. The build platform corresponds to the build platform of the invention, although the additive manufacturing device may be configured for operating with another build platform. The build platform comprises a build surface for building up the article thereon. The build surface is formed of, or comprises, ceramic material. Further the build surface may be provided by a plurality of spaced planar surface sections that extend in a common plane. The surface sections may be provided by a plurality of ceramic blocks. The ceramic preferably has a non-porous material structure. For example, the ceramic may be sintered to full density. A gap may be formed between adjacent surface sections. The gap may have a width in a dimension of the common plane and a depth in a dimension perpendicular to the common plane. As defined above, each surface section may be polyangular, in particular square-shaped or rectangular. In some embodiments, the depth of the gap is greater than 1 mm. In other embodiments, the depth of the gap may be greater than 8 mm, for example 20 mm. As defined above, each surface section may have a surface roughness of Ra between 0.5 and 1.25 μm or Rz between 10 and 20 μm.

The ceramic material of the build surface preferably has a non-porous material structure which is typically created by sintering the ceramic to full density. For example, a sintering step may be carried out to obtain a ceramic build surface or ceramic block article having a "full" density of 94% or greater, 95% or greater, 96% or greater, 97% or greater, 98% or greater, 99% or greater, 99.5% or greater, or 99.9% or greater, of the theoretical density of the selected ceramic material. Heating and pre-sintering steps may be carried out as needed according to the ceramic material used. Subsequent to any pre-sintering or heating steps necessary, sintering of the porous ceramic article is typically carried out under the flowing conditions: temperature: from 900° C. to 2300° C., from 100° C. to 2000° C., from 2050° C. to 2300° C. or from 1800° C. to 2100° C.; or 900° C. or greater, 1200° C. or greater, 1400° C. or greater, above 1600° C. or greater, or 1900° C. or greater; and 2300° C. or less, 2250° C. or less, 2200° C. or less, 2150° C. or less, 2100° C. or less, 2050° C. or less, or 2000° C. or less; at atmospheric/environmental conditions of: air or inert gas (e.g., nitrogen, argon); pressure: ambient pressure (e.g., 1013 mbar); and duration: until a density of 94% to 100% of the final density of the material has been reached. Alternatively to ambient pressure, the sintering may be carried out at elevated pressure or decreased pressure.

Each ceramic block may have one or more recesses that extend into the ceramic block from a side opposite off the surface section. The ceramic blocks are preferably spaced from each other to provide the gap between. The ceramic blocks are preferably detachably attached to the build carrier of the additive manufacturing device.

In a further aspect the invention relates to a method of making a build platform for use in an additive manufacturing device for layerwise building up an article from a light-hardenable resin on a build surface formed by the build platform. The method comprises the step of providing at least one precursor of a ceramic block (further referred to as "ceramic block precursor") made of ceramic, or providing a plurality of precursors of ceramic blocks (further referred to as "ceramic block precursors") made of ceramic. Further, the method may comprise the step of sandblasting a surface of each ceramic block precursor. The sandblasted surface preferably forms a surface section of a build surface. The step of sandblasting may include the use of sand composed of $Al_2O_3$, which is commercially available from BEGO Bremer, Goldschlägerei Wilh. Herbst GmbH & Co. KG located in Bremen, Germany.

The method may further comprise the steps of providing a green body or a plurality of green bodies made of pressed ceramic powder and sintering the green body or green bodies to or toward full density and thereby providing the ceramic block precursor(s). The method may further comprise the step of milling one or more recesses into the green body/green bodies.

FIG. 1 shows an additive manufacturing device 1 as it may be used with the present invention. The additive manufacturing device 1 is configured for building up a physical object from a light-hardenable resin. In the example, the object is formed of a plurality of dental articles 100 that are built up from a light-hardenable resin 11. Although in the example a plurality of dental crowns are shown, dental articles may further include, for example, dental bridges, dental inlays or one or more replacement teeth. Additionally, article 100 may be any three-dimensional object created by consecutively adding layers and not necessarily or exclusively a dental article. By way of example only, article 100 may subsequently be referred to as a dental article.

As illustrated, the additive manufacturing device 1 comprises a vat 3 in which the light-hardenable resin 11 can be provided. For providing the light-hardenable resin, the additive manufacturing device 1 may have one or more tanks (not illustrated) for storing the light-hardenable resin and a means for dispensing portions of the light-hardenable resin into the vat 3. The light-hardenable resin may be selectively provided different colors, as desired. The light-hardenable resin is also generally referred to as photopolymerizable resin in the field of dental material practice. The light-hardenable resin has a liquid or pasty (and thus flowable) consistency. The vat 3 has a light permeable base 2. In the example, the overall vat 3 is made of a transparent material. Suitable materials for the vat 3 include, for example, silica glass or polycarbonate. Other materials are possible, as known by those skilled in the art.

The vat 3 is generally cup-shaped. In particular, the vat 3 has a bottom wall 3a, a side wall 3b and forms an opening opposite of the bottom wall 3a. The vat 3 in the example is generally rectangular (has a rectangular side wall), although other geometries are possible.

The additive manufacturing device 1 is generally configured to build up one or more objects by stereolithography. Stereolithography provides a way to build up a physical object (or the plurality of articles 100) by successively hardening portions, in particular layers, of the light-hardenable resin. Accordingly, each built up layer consists of hardened resin. The hardened resin is solid and not flowable. The dimension in which the layers are "stacked" or provided onto each other is referred to herein as "build dimension" and is designated as "B" in the Figure. The shape in the remaining two dimensions is controlled by the shape of each of the layers of hardened resin.

The shape of the individual layers of hardened resin is determined by exposure of selected portions of a layer of light-hardenable resin. This is performed by a light source 5, which in the illustrated example is an image projector. The image projector is controlled (provided with images) by a computer based on a three-dimensional virtual object that is virtually sliced in layers of a desired thickness. The image projector may be based on Digital Light Processing™. Digital Light Processing (DLP) uses micro-mirrors arranged in a matrix on a semiconductor chip. Such semiconductor chips are known as Digital Micromirror Devices ("DMD"). Typical mirrors of a DMD have a size of about 5 μm or less. Each of the mirrors are movable between two positions by control of the semiconductor. In the one position, the mirror is positioned to reflect light directed on the mirror through the light output, whereas in the other position the mirror is positioned so that the light directed on the mirror does not exit the projector. Each mirror typically represents one pixel in the projected image so that the number of mirrors typically corresponds to the resolution of the projected image. The skilled person will recognize that other projector techniques or a laser beam may be likewise used with the additive manufacturing device of the invention.

The light source 5 is arranged beneath a light permeable area 7 of the additive manufacturing device 1. The light permeable area 7 is arranged generally horizontal (perpendicular to the direction of the force of gravity) and the light source 5 is arranged on that side of the light permeable area 7 that faces toward the center of gravity. In the example, the light permeable area 7 is provided in a housing 6 of the additive manufacturing device 1. The vat 3 is removably placed with the light permeable base 2 on the light permeable area 7. Therefore, light emitted by the light source 5 and transmitted through the light permeable area 7 of the housing 6 is also transmitted through the light permeable base 2 of the vat 3. Further, because the vat 3 is removably placed in the additive manufacturing device 1, the vat 3 can be replaced by another vat, for example a vat for use with a differently colored light-hardenable resin.

It is preferred that the light permeable area 7 and the light permeable base 2 are transparent and clear. Thus, the image sharpness of the image projected to the light permeable base can be maximized. This is also a basis for building up the object at maximized accuracy. It is noted that in another example the light permeable area and the light permeable base may be combined in one piece.

The additive manufacturing device 1 comprises a build carrier 4. The build carrier 4 is arranged on the side of the light permeable area 7 opposite of the light source 5. In one embodiment the build carrier 4 is configured for directly building up an object thereon. In another embodiment, the build carrier 4 is provided with a plurality of ceramic blocks 13 on which the dental articles 100 are built up, as discussed in more detail below.

The build carrier 4 together with the plurality of ceramic blocks 13 can be positioned relative to the light permeable base 2 (and the light permeable area 7) by computer control. The build carrier 4 with the plurality of ceramic blocks 13 is movable at least in the build dimension B. In another example, the build carrier may be movable in one or two dimensions perpendicular to the build dimension B.

The articles 100 are build up in the additive manufacturing device 1 in the build dimension B. In particular the build-up process is performed downwards (in the direction of the force of gravity of the Earth) in relation to a portion or layer of the object created first. This is achieved in that the additive manufacturing device 1 pulls the dental articles 100 successively upwards (away from the center of gravity of the Earth and away from the light permeable area 7) as the dental articles 100 are built up.

The build carrier 4 is connected to a linear drive 9 via a support 8. The linear drive 9 in the example has a spindle (not shown) which is mechanically coupled to the support 8 such that the support 8 can be moved in two directions in the build dimension B. The linear drive 9 further has a motor 10 and a position measuring device. Thus, the support 8 and the attached build carrier 4 can be accurately positioned by control of the additive manufacturing device 1 via Computer Numerical Control (CNC). The skilled person will recognize that the support 8 can be itself configured as build carrier in another example. Further the skilled person will recognize that the build carrier 4 may be connected by other means with the linear drive. Further, other drives than a spindle drive are possible. Additionally, the skilled person will recognize that the support 8, carrier 4, the build platform and the build surface may be integral, that is formed or made at the same time, or of the same material, or being incapable of being separated without damaging one or more of the integral parts. For example, in some embodiments one or more of the support 8, carrier 4, build platform or build surface comprise a ceramic material according to the present disclosure.

At illustrated in FIG. 1, the dental articles 100 are built up in the additive manufacturing device 1. Generally, the dental articles 100 are build up in a region between the build carrier 4, in particular between the ceramic blocks 13, and the light permeable base 2. The dental articles 100 are carried via support structures 103 by the ceramic blocks 13 with the ceramic blocks 13 being attached to the build carrier 4.

A light-hardenable resin 11 is provided in the vat 3. The amount of the light-hardenable resin 11 is selected such that a bath from light-hardenable resin of a pre-determined fill level is formed. The build carrier 4 including the ceramic blocks 13 is positioned (not shown) such that the ceramic blocks 13 penetrate into the bath of light-hardenable resin but such that the ceramic blocks 13 are still spaced from the light permeable base 2. At this stage the image projector 5 can be used to emit light through the light permeable base 2 into the light-hardenable resin 11 present in the space between the light permeable base 2 and the ceramic blocks 13. The light is preferably emitted in the form of a two-dimensional pattern in a plane parallel to the light permeable base 2. Accordingly, the light-hardenable resin 11 is irradiated locally in accordance to the shape of the light pattern. In particular, any light pixel of the pattern causes such portions of the light-hardenable resin 11 to harden that are exposed to the light of the light pixel. The light-hardenable resin 11 is typically light permeable to a certain extent so that the light penetrates entirely through a layer formed by the light-hardenable resin 11. Therefore, by hardening of the light-hardenable resin, portions (in particular layers) of hardened resin are created. These portions of hardened resin successively build up onto each other and become part of a more and more complemented object. From this stage the complemented object can be retracted from the light permeable base 2, so as to create a new space filled with not yet hardened light-hardenable resin which can be irradiated by a further light pattern to further complement the object, and so on, until the object is built up layer by layer completely.

The ceramic blocks 13 are provided with a retention surface that face the light permeable area 7. The retention surface provides for a retention of the hardened resin and thus causes the dental articles 100 to adhere on the ceramic blocks 13. The retention of the hardened resin is better than the retention of the hardened resin on the light permeable base 2. Thus, upon pulling the object away from the light permeable base, the object stays retained on the ceramic blocks 13, while it disconnects from the light permeable base.

The light permeable base 2 is optionally coated with a non-stick coating, for example a polytetrafluoroethylene. Thus, the hardened resin easily loosens from the light permeable base 2 while the hardened portions adhere to each other. Therefore, any breaking apart of the built-up object during retraction can be prevented.

During retraction of the object, the light-hardenable resin in the vat flows into the emerging space left by the object. To prevent the fill level from dropping below the thickness of the space between the light permeable base 2 and the ceramic blocks 13 (which could cause a void in the object), further light-hardenable resin is provided in the vat prior to and/or simultaneously with retraction of the object.

After building up the dental articles 100, excess (liquid or pasty) light-hardenable resin that adheres to the article is desirably removed. The excess light-hardenable resin may be removed for example by spin cleaning, which comprises the method steps of spinning the dental articles 100 at a velocity that causes the excess light-hardenable resin to separate from the dental articles 100 by centrifugal forces. Excess light-hardenable resin may adhere to the article because light-hardenable resin typically does not run off entirely from the article. Although such adhering excess light-hardenable resin may be hardened (post-cured) to save any cleaning step it has been found that the adhering light-hardenable resin may not form a uniform layer. Accordingly, adhering excess light-hardenable resin may negatively affect the accuracy of the shape of the article.

Figure 2:
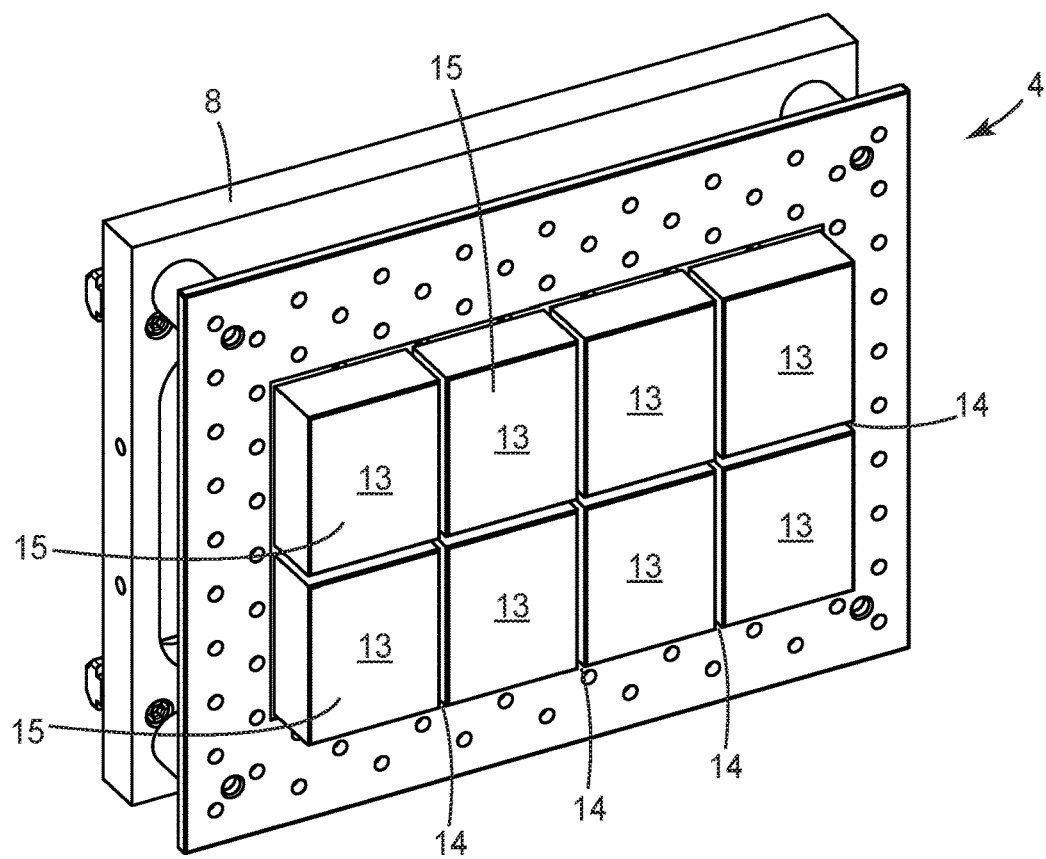
FIG. 2 is a perspective view of a build platform according to one embodiment of the invention, mounted to a build carrier of an additive manufacturing device.

FIG. 2 shows the build carrier 4 including the ceramic blocks 13 in more detail. The build carrier 4 in the example is shown mounted on the support 8 of the additive manufacturing device. The support 8 is preferably part of the additive manufacturing device and the build carrier 4 including the ceramic blocks 13 is preferably detachably attached to the support 8. Thus, the build carrier 4 including the ceramic blocks 13 can be replaced by another build carrier. For example, in the case of dental articles, the dental articles are built up on the ceramic blocks the build carrier 4, and then the build carrier may be replaced by a new (empty) build carrier for building up further dental articles on the new build carrier. Thus, idle times of the additive manufacturing device can be minimized.

The ceramic blocks 13 are spaced from each other such that a gap 14 is formed between adjacent ceramic blocks 13. Each gap has a width in a dimension of the shortest distance between two adjacent ceramic blocks 13. In the illustrated example, the gap has a uniform width. Further, preferably the retention surface 15 of each ceramic block 13 is planar. In the example the retention surfaces 15 of all ceramic blocks 13 are arranged in one plane. However, the plurality of ceramic blocks 13 may comprise a first subset of ceramic blocks 13 having retention surfaces 15 in a first plane and a second subset of ceramic blocks 13 having retention surfaces 15 in a different second plane. Thus, objects may for example be built up on the first subset of ceramic blocks 13 timely before further objects may be built up on the second subset of ceramic blocks 13.

Each gap 14 further has a length in a dimension across several ceramic blocks 13 and a depth in a dimension perpendicular to the plane or planes formed by the retention surfaces 15. The gap 14 is dimensioned in width, length and depth such that light-hardenable resin can be received therein. For example, in case the ceramic blocks 13 are positioned into a bath of light-hardenable resin with the retention surfaces 15 plunging into the bath, the light-hardenable resin is displaced toward the gaps 14. It has been found that any air eventually present between the retention surfaces 15 (or a layer of hardened resin) and the light-hardenable resin tends to move toward the gaps 14. Accordingly, the gaps 14 help building up an object having a minimized content of voids caused by entrapped air.

Figure 3:
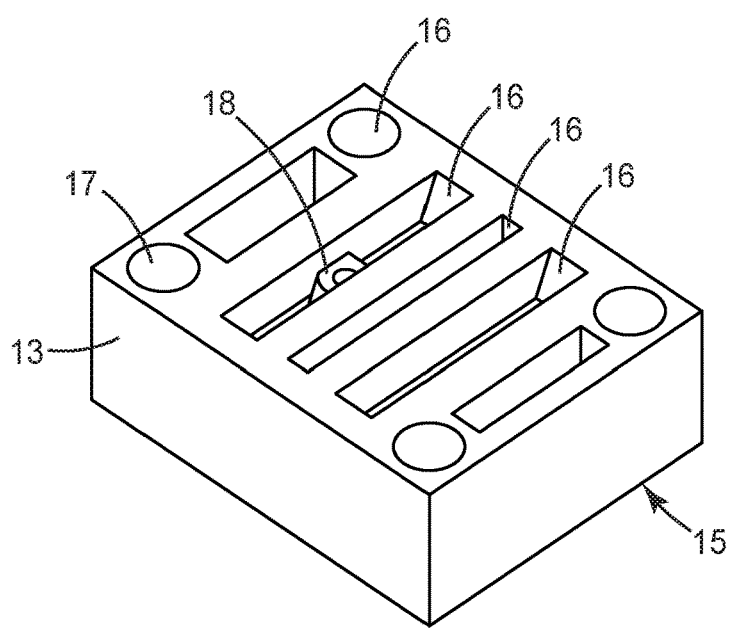
FIG. 3 is a perspective view of a ceramic block according to one embodiment of the invention.

FIG. 3 shows a ceramic block 13 in more detail. The ceramic block 13 is shown from a rear side, which is the side opposite of the retention surface 15 formed by a front side of the ceramic block 13. The ceramic block 13 has a plurality of recesses 16. The recesses 16 may be used for fixing the ceramic block 13 on the build carrier. In the example the ceramic block 13 is provided with one or more threaded inserts 17. The threaded insert 17 may be tightly fixed within the ceramic block 13 by an adhesive, for example. The ceramic block 13 therefore can be fixed using a screw that is screwed into the threaded insert 17.

Further, the ceramic block 13 may be provided with one or more threaded slot nuts 18. The slot nut 18 may be used in addition or as an alternative to the threaded inserts 17.

Figure 4:
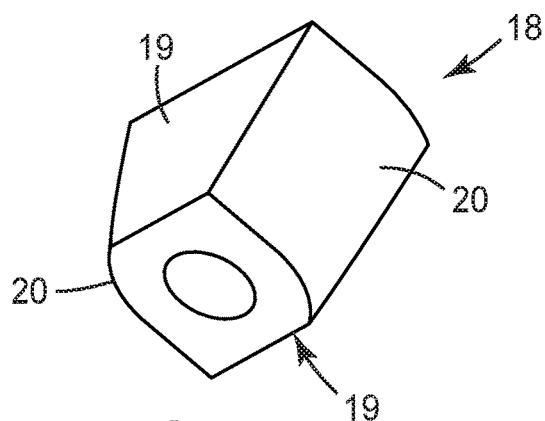
FIG. 4 is a perspective view of a slot nut for use with the ceramic block of FIG. 3.
Figure 5:
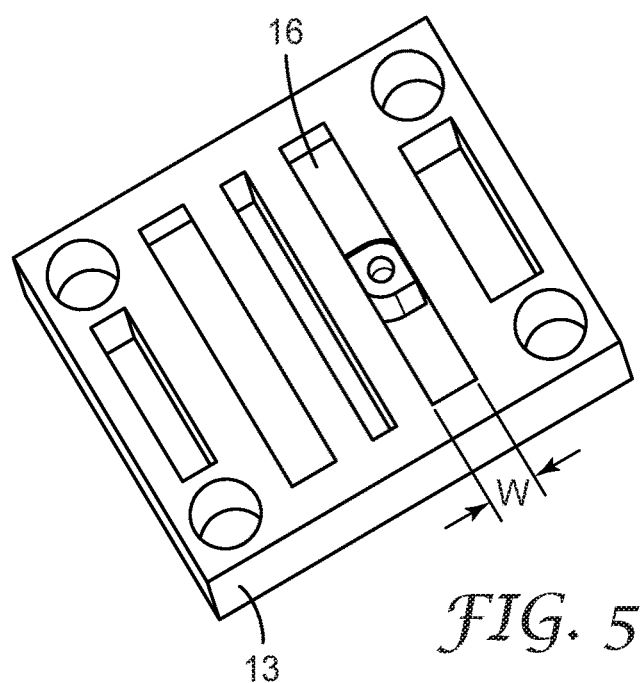
FIG. 5 is a perspective views of the ceramic block of FIG. 3 in combination with the slot nut of FIG. 4.
Figure 6:
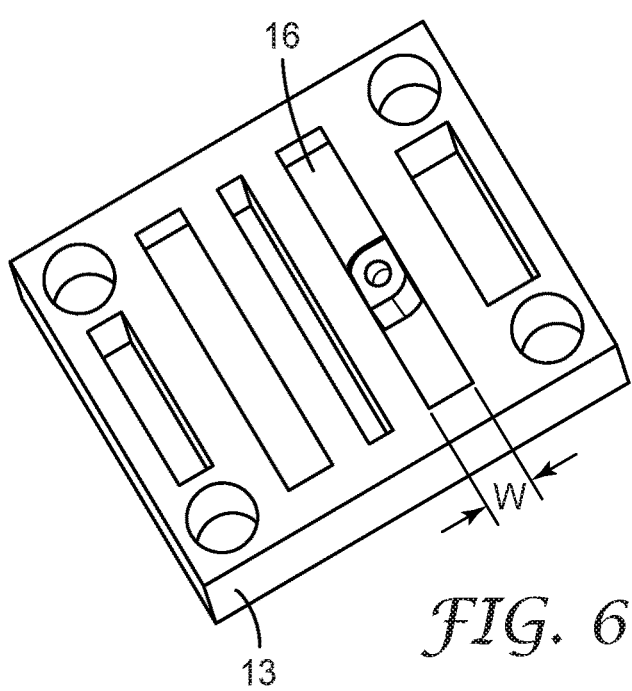
FIG. 6 is a perspective views of the ceramic block of FIG. 3 in a different combination with the slot nut of FIG. 4.

FIG. 4 shows the threaded slot nut 18 in more detail. The slot nut 18 in the example is V-shaped for cooperating with a V-shaped recess in the ceramic block. The recess 16 in the ceramic block (see FIGS. 5 and 6) widens in a direction from the rear side of the ceramic block 13 further into the ceramic block 13. The slot nut 18 has a flattened dimension formed by two flats 19. The flattened dimension is equal or smaller than a smallest width (see "W" in FIGS. 5 and 6) of the recess. Thus, the slot nut 18 is enabled to be inserted into the recess of the ceramic block as shown in FIG. 5. After insertion into the recess 16 the slot nut 18 is turned so that the V-shape of the slot nut 18 engages the V-shape of the recess. To enable turning, the slot nut 18 has a rounded structure 20.

Figure 7:
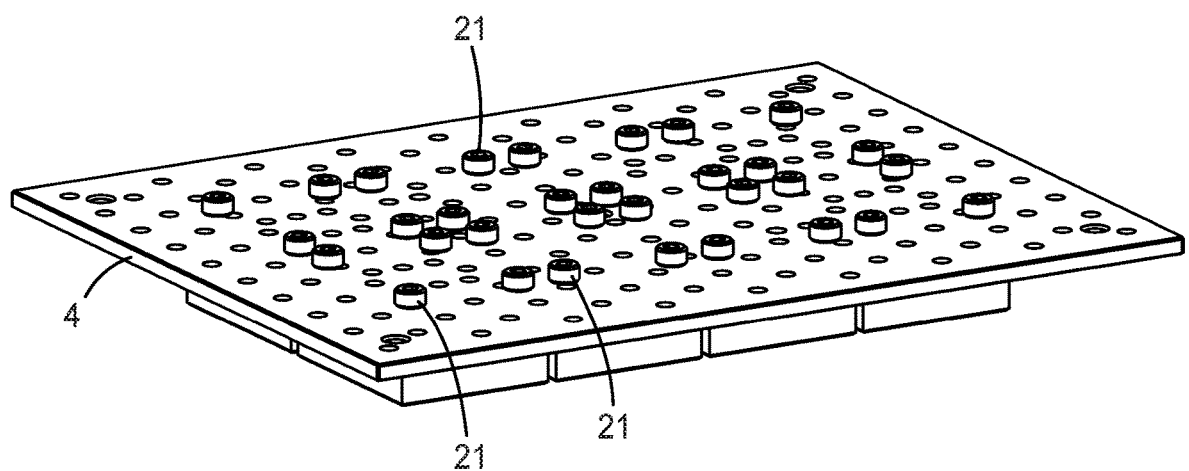
FIG. 7 is a perspective view of a build platform according to one embodiment of the invention, without ceramic blocks.

FIG. 7 shows the build carrier 4 without any ceramic blocks (for example at a stage at which the ceramic blocks are not yet mounted on the build carrier or at a stage at which the ceramic block is removed from the build carrier 4). The build carrier 4 is provided with a plurality of positioning pins 21 for engaging the recesses of the ceramic blocks. Accordingly, the positioning pins 21 have a diameter that corresponds to the width of the recesses. In the example four positioning pins 21 are provided for each ceramic block. However more or less positioning pins 21 may be likewise used. In the example the positioning pins 21 have a cylindrical shape. In this case at least two positioning pins 21 are used to provide a predetermined position of the ceramic block on the build carrier 4. In some embodiments the ceramic block(s) comprise zirconia ($ZrO_2$).

Ceramic Materials

The build surface comprising ceramic material of the present disclosure include particles of at least one ceramic material. In many embodiments, the ceramic particles comprise metal oxide ceramic particles, non-oxide ceramic particles, or any combination thereof.

In some embodiments, the ceramic particles are selected from the group consisting of zirconia ($ZrO_2$), silica ($SiO_2$), alumina ($Al_2O_3$), yttria ($Y_2O_3$), ceria ($CeO_2$), magnesium-magnesia aluminate (MMA), magnesium oxide (MgO), hydroxyapatite ($Ca_5(PO_4)_3OH$), fluorapatite ($Ca_5(PO_4)_3F$), chlorapatite ($Ca_5(PO_4)_3Cl$), calcite ($CaCO_3$), cordierite ($Mg_2Al_4Si_5O_{18}$), silicon carbide (SiC), silicon nitride ($Si_3N_4$), boron carbide ($B_4C$), titanium diboride ($TiB_2$), zirconium diboride ($ZrB_2$), boron nitride (BN), titanium carbide (TiC), zirconium carbide (ZrC), aluminium nitride (AlN), calcium hexaboride ($CaB_6$), MAX phase ($M_{n+1}AX_n$), and any combination thereof. In select embodiments, high-purity particles are used, in which the total content of metal impurities is preferably less than 100 ppm, particularly preferably less than 50 ppm. In alternate embodiments, particles are used having a total content of metal impurities of about 2,000 ppm.

In certain embodiments, the ceramic particles may include a nano-filler. Optionally, the nano-filler comprises nano-cluster(s). One or more different kinds of nano-cluster (s) can be present. It has been found that compared to other fillers, using nano-cluster(s) can be beneficial because it allows for the formulation of a composition with high filler load resulting in better mechanical properties, e.g. polish-ability or abrasion and in higher aesthetics. The nano-cluster, if present, can typically be characterized by at least one or all of the following features: specific surface area: from 30 to 400 or from 60 to 300 or from 80 to 250 $m^2/g$; comprising particles of $SiO_2$, $ZrO_2$, $Al_2O_3$ and mixtures thereof.

If desired, the specific surface area of the nano-cluster can be determined according to the method of Brunauer, Emmet and Teller (BET), using a measurement device (e.g., MONOSORB, available from Quantachrome Instruments (Boynton Beach, FL)).

Suitable zirconia particles include for instance and with-out limitation, nano-sized zirconia particles(s) having at least one and up to all of the following parameters or features: primary particle size XRD (diameter): from 2 to 100 nm, 2 to 50 nm, 2 to 20 nm, 2 to 15 nm, or 4 to 15 nm; being essentially spherical, cuboid or a mixture of spherical and cuboid; being non-associated; being crystalline; not being coated with an inorganic coloring agent.

Suitable nano-sized zirconia particles can have at least one and up to all of the following features: $ZrO_2$ content: from 70 to 100 mol % or 80 to 97 mol %; $HfO_2$ content: from 0 to 4.5 mol %, 0 to 3 mol %, or 0.1 to 2.8 mol %; Stabilizer selected from $Y_2O_3$, $CeO_2$, MgO, CaO, $La_2O_3$ or a combination thereof in an amount from 0 to 30 mol %, 1.5 to 16 mol %, 2 to 10 mol %, or 2 to 5 mol %; $Al_2O_3$ content: from 0 to 1 mol % or from 0.005 to 0.5 mol % or from 0.01 to 0.2 mol %. According to one embodiment, the nano-sized zirconia particles are characterized as follows: $ZrO_2$ content: from 70 to 98.4 mol %; $HfO_2$ content: from 0.1 to 2.8 mol %; $Y_2O_3$ content: from 1.5 to 28 mol %. Nano-sized zirconia particles can be obtained or are obtainable by a process comprising the steps of hydrothermal treatment of an aqueous metal salt solution or suspension (e.g. zirconium salt, yttrium salt). Such a process is described in WO 2013/055432 (Kolb et al.).

Suitable silica particles include for instance and without limitation spherical silica particles and non-spherical silica particles. Spherical silica particles in aqueous media (sols) are well known in the art and are available commercially; for example, as silica sols in water or aqueous alcohol solutions under the trade designations LUDOX from W.R. Grace & Co. (Columbia, MD), NYACOL from Nyacol Nanotechnologies Inc. (Ashland, MA), or NALCO from Nalco Company (Naperville, IL). One useful silica sol with a volume average particle size of 5 nm, a pH of 10.5, and a nominal solids content of 15 percent by weight, is available as NALCO 2326 from Nalco Company. Other useful commercially available silica sols include those available as NALCO 1115 and NALCO 1130 from Nalco Company, as REMASOL SP30 from Remet Corp. (Utica, NY), and as LUDOX SM from W.R. Grace & Co. Other suitable silica particles include fumed silica. Agglomerated silica particles are commercially available e.g. from Degussa, Cabot Corp or Wacker under the product designation AEROSIL, CAB-O-SIL and HDK. The specific surface of the hydrophobic fumed silica is typically from 100 to 300 $m^2/g$ or from 150 to 250 $m^2/g$. A mixture of different fumed silica can be used, if desired. For example, a mixture of fumed silica the surface of which has been treated with a hydrophobic surface treating agent and fumed silica the surface of which has been treated with a hydrophilic surface treating agent can be used. A suitable nano-silica comprising aggregated nano-sized particles can be produced according to the processes described e.g. in U.S. Pat. No. 6,730,156 (Zhang et al; preparatory example A).

Suitable alumina particles include for instance and with-out limitation aqueous alumina dispersions (e.g., average particle size of 500 nm alumina particles available from Sumitomo Chemicals (New York, NY)) and alumina particles from Saint-Gobain Surface Conditioning Group (Anaheim, CA).

Suitable yttria particles include for instance and without limitation yttrium oxide available from Treibacher Industrie AG (Althofen, Austria).

Suitable ceria particles include for instance and without limitation colloidal cerium oxide in the form of colloidal sols and nano-structured powders available from NYACOL Nano Technologies, Inc (Ashland, MA). NYACO CDP, for example, has a particle size of 25-30 nm and is a dispersible ceria powder, while NYACOL Ce120/10 is colloidal ceria having a particle size of 100-140 nm and water as a carrier.

Suitable magnesium-magnesia aluminate particles include for instance and without limitation magnesium aluminate spinel in the form of nano-structured powders available from American Elements (Los Angeles, CA). 99.9% Magnesium Aluminate, Spinel Nanopowder, for example, has a nominal particle size of less than 50 nm. Larger particle powders are available from Reade International, Corp (Riverside, RI) as Spinel Powder ($MgAl_2O_4$), with a particle size of 1-5 micrometers.

Suitable magnesium oxide particles include for instance and without limitation particles in the form of a water dispersion. It should be understood, however, that a certain amount of magnesium oxide converts to magnesium hydroxide in the presence of water. Preferred magnesium oxide dispersions are made from commercially available magnesium oxide such as ELASTOMAG 170 from Martin Marietta Magnesia Specialties, LLC (Baltimore, MD) and MAGLITE A from Hallstar (Chicago, IL). Magnesium oxides may be dispersed by those skilled in the art or obtained from vendors such as Tiarco Chemical and H. M. Royal.

Suitable apatite particles include for instance and without limitation, hydroxyapatite, fluorapatite and chlorapatite, with high concentrations of OH-, F- and Cl-ions, respectively, in the crystal. For example, suitable hydroxyapatite particles include for instance and without limitation hydroxyapatite from CAM Bioceramics (Leiden, The Netherlands). Hydroxyapatite has been used as a bone substitute because natural bone is approximately 70% hydroxyapatite by weight and 50% hydroxyapatite by volume. Hydroxyapatite has also been widely used for various implant applications such as bioactive space fillers, as scaffolding for the in-growth of tissues, and as a coating for implants to promote bonding with tissue. Syntheses of chlorapatite and fluorapatite have been reported in the literature, such as in Sanjeevi et al., Journal of the European Ceramic Society, 2007, 27, 2287-2294; Montazeri et al., International Journal of Nanomedicine, 2011, 6, 197-201; and Ghomi et al., Materials Research Innovations, 2013, 17:4, 257-262.

Suitable calcite particles include for instance and without limitation calcite nanoparticles commercially available under the trade designations "MULTIFEX MM" and "ALBAFIL" from the Cary Company (Addison, IL); "SOCAL 31" from Solvay Specialty Chemicals, LTD. (Houston, TX); and "NPCC-111" and "NPCC-113" from NanoMaterials Technology LTD (Singapore).

Suitable cordierite particles include for instance and without limitation cordierite particles commercially available from Reade International, Corp (Riverside, RI) as Cordierite powder with an average particle size of 6-7 micrometers, and from American Elements (Los Angeles, CA) as Cordierite or Magnesium Aluminum Silicate.

Suitable silicon nitride particles include for instance and without limitation powders having a mean particle or agglomerate size ($D_{50}$) of 0.5-20 micrometers, such as 1-10 micrometers. The oxygen content of silicon nitride powder is preferably less than 2% by weight and the total carbon content is preferably less than 0.35% by weight. A commercially available silicon nitride powder can be obtained under the trade designation SILZOT from AlzChem Group AG (Trastber, Germany).

Suitable boron carbide particles include for instance and without limitation, $B_4C$ powders having a purity of 97% by weight or higher, and a mean particle size ($D_{50}$) of 0.1-8 micrometers. An example of a suitable boron carbide powder is 3M Boron Carbide Powder commercially available from 3M Company (St. Paul, MN).

Suitable titanium diboride particles include for instance and without limitation, $TiB_2$ powders having a mean particle size ($D_{50}$) of about 2-20 micrometers. An example of a suitable titanium diboride powder is 3M Titanium Diboride Powder commercially available from 3M Company based in St. Paul, Minnesota.

Suitable zirconium diboride particles include for instance and without limitation, high purity or ultra-high purity $ZrB_2$ powders available from American Elements (Los Angeles, CA).

Suitable boron nitride particles include for instance and without limitation, agglomerates of platelet-shaped, hexagonal boron nitride primary particles, wherein the hexagonal boron nitride primary particles are connected to one another by means of an inorganic binding phase. The inorganic binding phase comprises at least one nitride and/or oxynitride. The nitrides or oxynitrides are preferably compounds of the elements aluminum, silicon, titanium and boron. An example of a suitable boron nitride powder is 3M Boron Nitride Cooling Fillers Platelets commercially available from 3M Company.

Suitable titanium carbide particles include for instance and without limitation, TiC powders having a mean particle size ($D_{50}$) of 1 to 3 micrometers. An example of a suitable titanium carbide powder is TiC Grade High Vacuum 120 commercially available from HC-Starck (Munich, Germany).

Suitable zirconium carbide particles include for instance and without limitation, ZrC powders having a mean particle size ($D_{50}$) of 3 to 5 micrometers. An example of a suitable zirconium carbide powder is ZrC Grade B commercially available from HC-Starck.

Suitable aluminum nitride particles include for instance and without limitation, AlN powders having a mean particle size ($D_{50}$) of 0.8 to 2 micrometers. An example of a suitable aluminum nitride powder is AlN Grade C commercially available from HC-Starck.

Suitable calcium hexaboride particles include for instance and without limitation, $CaB_6$ powders commercially available from 3M Company as 3M Calcium Hexaboride.

MAX phase particles are layered hexagonal carbides and nitrides having the general formula of $M_{n+1}AX_n$, wherein n=1 to 3, M is an early transition metal, A is an A-group element, and X is independently selected from carbon and nitrogen. The A-group elements are preferably elements 13-16. An example of a suitable MAX phase powder is MAXTHAL 312 powder commercially available from Kanthal (Hallstahammar, Sweden).

Light-Hardenable Resin

The light-hardenable resin (photopolymerizable slurry or sol) typically includes at least one radiation curable monomer; a solvent; a photoinitiator; optionally an inhibitor; and optionally ceramic particles. For example, suitable components of the radiation curable monomer, ceramic particles, solvent, photoinitiator, and inhibitor, of the present disclosure may be found, for example, in U.S. Provisional Patent Application No. 62/883,239, to Shah et al, filed on Aug. 6, 2019, assigned to the present assignee and incorporated by reference in its entirety herein.

In some embodiments, the light-hardenable resin (photopolymerizable slurry or sol) may comprise one or more radiation curable monomers being part of or forming an organic matrix. The radiation curable monomer(s) being present in the photopolymerizable slurry or sol can be described as first, second, third, etc., monomer, if more than one monomer is present. The nature and structure of the radiation curable monomer(s) is not particularly limited unless the desired result cannot be achieved. In some embodiments, the at least one radiation curable monomer comprises an acrylate. Preferably, the at least one radiation curable monomer includes a (meth)acrylate, an epoxy, a silane, or combinations thereof. In some embodiments, upon polymerization, the radiation curable monomers form a network with the (preferably) homogeneously dispersed ceramic particles.

The light-hardenable resin may or may not include ceramic particles, such as the ceramic materials described above. The light-hardenable resin may also be referred to as photopolymerizable resin, or photopolymerizable slurry or sol. In some embodiments the light-hardenable resin itself may contain ceramic particles. In embodiments comprising ceramic particles, the photopolymerizable slurry or sol may comprise 20 wt. % or greater ceramic particles, based on the total weight of the photopolymerizable slurry or sol, 21 wt. % or greater, 22 wt. %, 23 wt. %, 24 wt. %, 25 wt. %, 26 wt. %, 27 wt. %, 28 wt. %, 29 wt. %, 30 wt. %, 32 wt. % or 35 wt. % or greater; and 60 wt. % or less, 29.5 wt. % or less, 28.5 wt. % or less, 27.5 wt. % or less, 26.5 wt. % or less, 25.5 wt. % or less, or 24.5 wt. % or less ceramic particles, based on the total weight of the photopolymerizable slurry or sol. Stated another way, the photopolymerizable slurry or sol can include between 20 percent by weight and 60 percent by weight of ceramic particles, based on the total weight of the photopolymerizable slurry or sol.

In some embodiments, the photopolymerizable slurry or sol comprises 3 volume percent (vol. %) or greater ceramic particles, based on the total volume of the photopolymerizable slurry or sol, 4 vol. %, 5 vol. %, 10 vol. %, 15 vol. %, 20 vol. %, 25 vol. %, 30 vol. %, 35 vol. %, 40 vol. %, 45 vol. %, 50 vol. %, 55 vol. %, 60 vol. %, 65 vol. %, or 70 vol. % or greater; and 70 vol. % or less, 65 vol. %, 60 vol. %, 55 vol. %, 50 vol. %, 45 vol. %, 40 vol. %, 35 vol. %, 30 vol. %, 25 vol. %, or 20 vol. % or less ceramic particles, based on the total volume of the photopolymerizable slurry or sol. Stated another way, the photopolymerizable slurry or sol can include for instance, between 3 percent by volume and 70 percent by volume of ceramic particles, 10 vol. % to 60 vol. %, or 20 vol. % to 50 vol. % ceramic particles, based on the total volume of the photopolymerizable slurry or sol.

The ceramic particles typically comprise an average (mean) particle size diameter (i.e., $D_{50}$) of 1 nanometer (nm) or greater, 3 nm, 4 nm, 5 nm, 6 nm, 7 nm, 8 nm, 9 nm, 10 nm, 12 nm, 15 nm, 17 nm, 20 nm, 25 nm, 30 nm, 40 nm, 50 nm, 60 nm, 75 nm, 90 nm, 100 nm, 125 nm, 150 nm, 175 nm, 200 nm, 225 nm, 250 nm, 350 nm, 500 nm, 750 nm, 1 micrometer, 1.25 micrometers, 1.5 micrometers, 1.75 micrometers, 2 micrometers, 2.5 micrometers, 3.0 micrometers, 3.5 micrometers, 4.0 micrometers, or 4.5 micrometers or greater; and a $D_{50}$ of 10 micrometers or less, 9.5 micrometers, 9 micrometers, 8.5 micrometers, 8 micrometers, 7.5 micrometers, 7 micrometers, 6.5 micrometers, 6 micrometers, 5.5 micrometers, 5 micrometers, 4.5 micrometers, 3 micrometers, 2 micrometers, 1.5 micrometers, 1 micrometer, 900 nm, 800 nm, 700 nm, 600 nm, 500 nm, 400 nm, 300 nm, or 250 nm or less. Stated another way, the ceramic particles may have an average particle size diameter ($D_{50}$) of 1 nm to 900 nm, 1 nm to 500 nm, 1 nm to 250 nm, 250 nm to 10 micrometers, 1 micrometer to 10 micrometers, 500 nanometers to 1.5 micrometers, or of 250 nm to 1 micrometer. The average (mean) particle size ($D_{50}$) refers to that particle diameter at which 50 percent by volume of the particles in a distribution of particles have that diameter or a smaller diameter, as measured by laser diffraction. Preferably, the average particle size is of the primary particles.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

What is claimed is:

1. An additive manufacturing device comprising:
a vat, wherein the vat is suitable in size and material to contain a liquid light-hardenable resin;
a build carrier comprising a build platform, the build platform comprising a build surface for building up an object thereon, wherein a surface section of the build surface comprises a ceramic material having a non-porous material structure, wherein the build surface comprises a plurality of spaced planar surface sections that extend in a common plane, and wherein a gap is formed between adjacent surface sections, the gap having a width in a dimension of the common plane and a depth in a dimension perpendicular to the common plane; and
a light source for emitting light toward the build surface, wherein build carrier and the light source are movable relative to each other;
wherein the build carrier is movable through the vat in a direction of build dimension.

2. The additive manufacturing device of claim 1, wherein the plurality of spaced planar surface sections forms the build surface.

3. The additive manufacturing device of claim 1, wherein the build platform further comprises zirconia.

4. The additive manufacturing device of claim 1, wherein the plurality of spaced planar surface sections are provided by a plurality of ceramic blocks, and wherein the plurality of ceramic blocks are detachably attached to the build carrier of the additive manufacturing device.

5. The additive manufacturing device of claim 1, wherein the ceramic material has a non-porous material structure having a full density of 94% or greater of a theoretical density of the ceramic material.

6. The additive manufacturing device of claim 1, wherein the ceramic material comprises zirconia.

7. The additive manufacturing device of claim 1, wherein each surface section of the plurality of spaced planar surface sections has a surface roughness of Rz between 10 and 20 µm.

8. The additive manufacturing device of claim 4, wherein each ceramic block has one or more recesses extending into the ceramic block from a side opposite of the surface section.

9. The additive manufacturing device of claim 4, wherein the ceramic blocks are spaced from each other to provide the gap.

10. A method of making an article comprising the steps of:
providing the additive manufacturing device of claim 1;
providing light-hardenable resin;
hardening the light-hardenable resin by using the light source to apply actinic radiation, such as UV radiation, visible radiation, e-beam radiation, or any combination thereof, having a sufficient energy to cure the light-hardenable resin.

* * * * *